(12) United States Patent
Ohtomo et al.

(10) Patent No.: US 10,324,183 B2
(45) Date of Patent: Jun. 18, 2019

(54) UAV MEASURING APPARATUS AND UAV MEASURING SYSTEM

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 15/702,902

(22) Filed: Sep. 13, 2017

(65) Prior Publication Data

US 2018/0081056 A1 Mar. 22, 2018

(30) Foreign Application Priority Data

Sep. 16, 2016 (JP) .................. 2016-181502

(51) Int. Cl.

| G01C 9/02 | (2006.01) |
|---|---|
| G01S 7/48 | (2006.01) |
| G06T 7/30 | (2017.01) |
| G01C 11/02 | (2006.01) |
| G01C 15/00 | (2006.01) |
| G01S 17/02 | (2006.01) |

(Continued)

(52) U.S. Cl.
CPC .......... *G01S 17/023* (2013.01); *B64C 39/024* (2013.01); *G01C 9/02* (2013.01); *G01C 11/025* (2013.01); *G01C 15/002* (2013.01); *G01S 7/4808* (2013.01); *G01S 7/4817* (2013.01); *G01S 17/42* (2013.01); *G01S 17/66* (2013.01); *G01S 17/89* (2013.01); *G06T 7/30* (2017.01); *B64C 2201/123* (2013.01)

(58) Field of Classification Search
CPC ......... G06T 7/30; G01S 17/42; G01S 17/023; G01S 7/4808; G01S 7/4817; G01S 17/66; G01S 17/89; G01C 9/02; G01C 11/025; G01C 15/002; B64C 39/024; B64C 2201/123

See application file for complete search history.

(56) References Cited

U.S. PATENT DOCUMENTS

| 2014/0210663 A1* | 7/2014 | Metzler | ................. | G01C 15/00 |
|---|---|---|---|---|
| | | | | 342/357.34 |
| 2014/0240498 A1* | 8/2014 | Ohtomo | ................. | B64D 47/08 |
| | | | | 348/144 |

(Continued)

FOREIGN PATENT DOCUMENTS

| JP | 2016-151422 A | 8/2016 |
|---|---|---|
| JP | 2016-151423 A | 8/2016 |

*Primary Examiner* — Brenda C Bernardi
(74) *Attorney, Agent, or Firm* — Nields, Lemack & Frame, LLC

(57) ABSTRACT

The invention provides a UAV measuring apparatus, which comprises a flying vehicle, a laser scanner mounted on the flying vehicle and for performing two-dimensional scanning with a reference optical axis extending in an approximately vertically downward direction as the center, an image pickup unit having an image pickup optical axis parallel to the reference optical axis and a control arithmetic component, wherein the control arithmetic component is configured to synchronize the two-dimensional scanning performed by the laser scanner with an image pickup performed by the image pickup unit, and to correspond a scanning locus obtained by the two-dimensional scanning with an acquired image.

10 Claims, 11 Drawing Sheets

(51) Int. Cl.
*G01S 17/42* (2006.01)
*G01S 17/66* (2006.01)
*G01S 17/89* (2006.01)
*G01S 7/481* (2006.01)
*B64C 39/02* (2006.01)

(56) References Cited

U.S. PATENT DOCUMENTS

| | | | | |
|---|---|---|---|---|
| 2014/0368373 | A1* | 12/2014 | Crain | G01S 5/02 342/5 |
| 2014/0368651 | A1* | 12/2014 | Irschara | G06T 7/00 348/148 |
| 2015/0116693 | A1* | 4/2015 | Ohtomo | G01C 15/002 356/4.01 |
| 2015/0220085 | A1* | 8/2015 | Ohtomo | G08G 5/0069 701/2 |
| 2015/0268058 | A1* | 9/2015 | Samarasekera | G06K 9/00637 701/409 |
| 2016/0131479 | A1* | 5/2016 | Kumagai | G01C 15/06 33/290 |
| 2016/0238385 | A1 | 8/2016 | Ohtomo et al. | |
| 2016/0238708 | A1 | 8/2016 | Ohtomo et al. | |
| 2016/0253808 | A1* | 9/2016 | Metzler | B64C 39/024 382/103 |

\* cited by examiner

IMAGE A    CORRESPONDENCE OF    IMAGE B
           SCANNING LOCI

UAV MEASURING APPARATUS AND UAV MEASURING SYSTEM

BACKGROUND OF THE INVENTION

The present invention relates to a UAV measuring apparatus which has a laser scanner or a camera mounted on an unmanned aerial vehicle (UAV) and measures a shape of a ground surface and to a UAV measuring system.

In recent years, a method, in which a laser scanner or a camera is mounted on a UAV and a surveying is performed, has begun to spread.

In a UAV measuring system having a laser scanner mounted on the UAV, a position of the UAV is measured by a GNSS (Global Navigation Satellite System) or the like, a ground surface is reciprocally linearly scanned by the laser scanner in a direction orthogonal to a flying direction, a distance to the ground surface and an angle are measured and a shape of the ground surface is determined.

In a UAV measuring system using the laser scanner, an approximately fixed direction is presupposed as a flying direction of the UAV, and a rotation or a tilt of a scanning direction is measured by using an IMU (Inertial Measurement Unit), scan data is aligned based on a measurement result of the IMU and a shape of the ground surface is obtained. A high accuracy is required for the IMU used in this system, and hence an expensive IMU is adopted.

On the other hand, in a UAV measuring system having a camera mounted on the UAV, the ground surface is photographed in such a manner that an overlap of 60% or more can be provided by the camera during the flight, and a shape of the ground surface is determined by a photogrammetry with the use of a photographed image.

In the photogrammetry, tilts or rotations between images are obtained by an orienting operation, by performing an absolute orientation, a shape of the ground surface is determined. The orienting operation between images is a complicated operation, and skills are required for insuring a high accuracy.

Further, there is also a UAV measuring system which has the laser scanner and the camera mounted on a UAV and performs both the ground surface measurement using the laser scanner and the photogrammetry, but this system cannot provide a large synergetic effect, and hence this system is not generalized.

SUMMARY OF THE INVENTION

It is an object of the present invention to provide a UAV measuring apparatus and a UAV measuring system which can easily acquire an image with three-dimensional data.

A UAV measuring apparatus according to the present invention comprises a flying vehicle, a laser scanner mounted on the flying vehicle and for performing two-dimensional scanning with a reference optical axis extending in an approximately vertically downward direction as the center, an image pickup unit having an image pickup optical axis parallel to the reference optical axis and a control arithmetic component, wherein the control arithmetic component is configured to synchronize the two-dimensional scanning performed by the laser scanner with an image pickup performed by the image pickup unit, and to correspond a scanning locus obtained by the two-dimensional scanning with an acquired image.

Further, in the UAV measuring apparatus according to the present invention, the two-dimensional scanning is a closed loop.

Further, in the UAV measuring apparatus according to the present invention, the control arithmetic component is configured to use a plurality of images with overlapping portions and the scanning loci, and to determine point where the scanning loci intersect with each other as a connecting point, and to connect the images with the scanning loci based on the connecting point.

Further, in the UAV measuring apparatus according to the present invention, the control arithmetic component is configured to image-match a previous image and a subsequent image which are acquired sequentially, to repeat to take over an information of a scanning locus included in the previous image to a corresponding portion of the subsequent image, and to integrate the information of the scanning locus in one image.

Further, the UAV measuring apparatus according to the present invention further comprises an attitude detector for detecting a tilt angle with respect to a verticality, wherein the attitude detector is configured to detect a tilt angle of the reference optical axis with respect to the verticality, and the control arithmetic component is configured to correct scanning data obtained by the laser scanner based on the detected tilt angle and to correct an acquired image to a horizontal image.

Further, in the UAV measuring apparatus according to the present invention, the control arithmetic component is configured to acquire two images in which the informations of the scanning locus are integrated in such a manner that an overlapping portion is present, to correct the two images to a horizontal image based on a detection result of the attitude detector, to image-match the two images based on the scanning loci present in the overlapping portion in common, and to fabricate a detailed three-dimensional map.

Furthermore, a UAV measuring system according to the present invention comprises a UAV measuring apparatus as described above and a total station installed at a known position, wherein the UAV measuring apparatus has a prism provided with a predetermined relationship with a reference position of the laser scanner, the total station is configured to measure the prism while tracking the prism, and to convert a measurement result by the UAV measuring apparatus into three-dimensional data of a ground coordinates system based on a distance measurement result of the total station.

According to the present invention, a UAV measuring apparatus comprises a flying vehicle, a laser scanner mounted on the flying vehicle and for performing two-dimensional scanning with a reference optical axis extending in an approximately vertically downward direction as the center, an image pickup unit having an image pickup optical axis parallel to the reference optical axis and a control arithmetic component, wherein the control arithmetic component is configured to synchronize the two-dimensional scanning performed by the laser scanner with an image pickup performed by the image pickup unit, and to correspond a scanning locus obtained by the two-dimensional scanning with an acquired image. As a result, an image with three-dimensional data can be easily acquired.

Further, according to the present invention, a UAV measuring system comprises a UAV measuring apparatus as described above and a total station installed at a known position, wherein the UAV measuring apparatus has a prism provided with a predetermined relationship with a reference position of the laser scanner, the total station is configured to measure the prism while tracking the prism, and to convert a measurement result by the UAV measuring apparatus into three-dimensional data of a ground coordinates system based on a distance measurement result of the total station. As a result, an image with three-dimensional data of a ground coordinates system can be easily acquired.

DETAILED DESCRIPTION OF THE PREFERRED EMBODIMENT

A description will be given below on an embodiment of the present invention by referring to the attached drawings.

Figure 1:
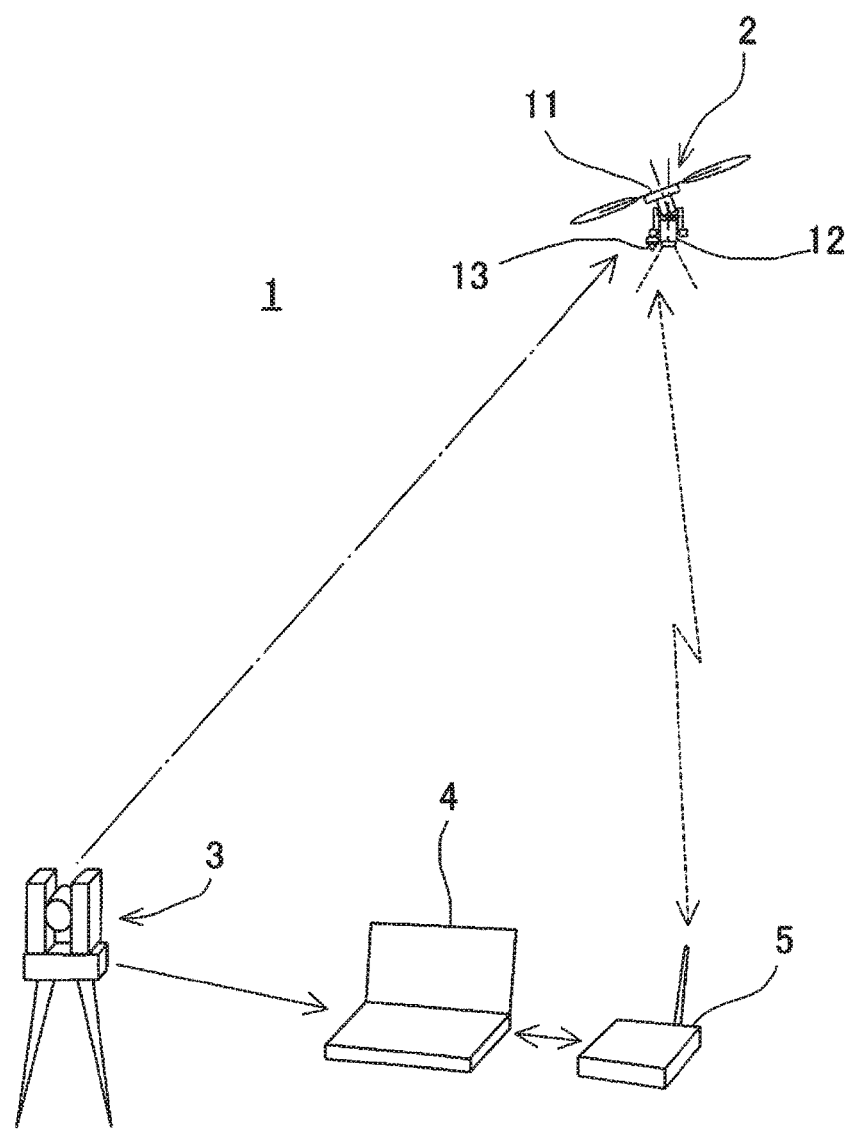
FIG. 1 is a system schematic view according to an embodiment of the present invention.

First, by referring to FIG. 1, a description will be given on a UAV measuring system 1 according to the present embodiment.

The UAV measuring system 1 is mainly constituted of a UAV measuring apparatus 2, a total station (TS) 3, a ground base station 4 and a remote controller 5.

The UAV measuring apparatus 2 mainly comprises a flying vehicle 11, a measuring device 12 which is provided to the flying vehicle 11 via a gimbal mechanism so as to freely tilt and has a measurement reference point, and a prism 13 as a retro-reflector which is provided integrally with the measuring device 12.

The total station 3 is provided at a known point (i.e. known three-dimensional coordinates), can perform a prism measurement by which a prism is measured as an object to be measured and a non-prism measurement by which a natural object or a structure is measured as an object to be measured, and also the total station 3 has a tracking function. In a case where the prism measurement is performed, while tracking a prism by the tracking function, the total station 3 measures three-dimensional coordinates of the prism.

Therefore, while the total station 3 tracks the prism 13 during a flight of the UAV measuring apparatus 2, the total station 3 measures a position of the prism 13 (i.e., a position of the measurement reference point, i.e., a position of the flying vehicle 11).

The total station 3 is electrically connected with the ground base station 4 in a wired or wireless manner, and measured three-dimensional coordinates are transmitted to the ground base station 4 as coordinates data (a positional information of the UAV measuring apparatus 2).

The ground base station 4 is, e.g., a PC, and has a display unit, an arithmetic device with an arithmetic function, a storage component for storing data and programs or the like and further a base station communication unit (to be described later).

As the programs, for example, there are a flight plan program in which a flight condition, a flight course, or the like to make the measuring device 12 to fly are set, a measurement program in which a measurement range, a measurement condition, or the like are set, and others.

The base station communication unit can communicate with the remote controller 5 in a wired or wireless manner, and enables transmitting or receiving data (e.g., the positional information of the UAV measuring apparatus 2, flight control data of the UAV measuring apparatus 2, or the like) between the ground base station 4 and the remote controller 5. Further, the base station communication unit is configured to be capable of performing data communication with the total station 3.

The remote controller 5 is adapted to remotely control a flight of the UAV measuring apparatus 2. A wireless communication can be performed between the remote controller 5 and the UAV measuring apparatus 2, and the flight control (a remote control of the flight) of the UAV measuring apparatus 2 is performed by the remote controller 5.

An instruction concerning the measurement is transmitted from the remote controller 5 to the UAV measuring apparatus 2, the remote controller 5 receives measurement data and image data transmitted from the UAV measuring apparatus 2, and further the measurement data and the image data are transmitted from the remote controller 5 to the ground base station 4.

The remote controller 5 is operated by an operator, it may be so arranged that the UAV measuring apparatus 2 is remotely controlled and the flight control, the execution of the measurement, the collection of the measurement data or the like are performed, or it may be so arranged that the remote controller 5 is operated by a remote control program and a flight control, an execution of the measurement and a collection of the measurement data or the like are automatically performed.

Further, a communication unit which communicates with the measuring device 12 is provided in the ground base station 4 and the ground base station 4 is configured to directly communicate with the measuring device 12, and the remote controller 5 may be omitted.

In terms of a safety management of the flying vehicle 11, a positional information during flight, a flight video image of the flying vehicle 11, a collimation video image provided by the total station 3 and a UAV state information (a power consumption state, an information of each sensor in a control system) are wirelessly transmitted to the ground base station 4, and they can be monitored on a screen of a display unit in the ground base station 4.

Figure 2:
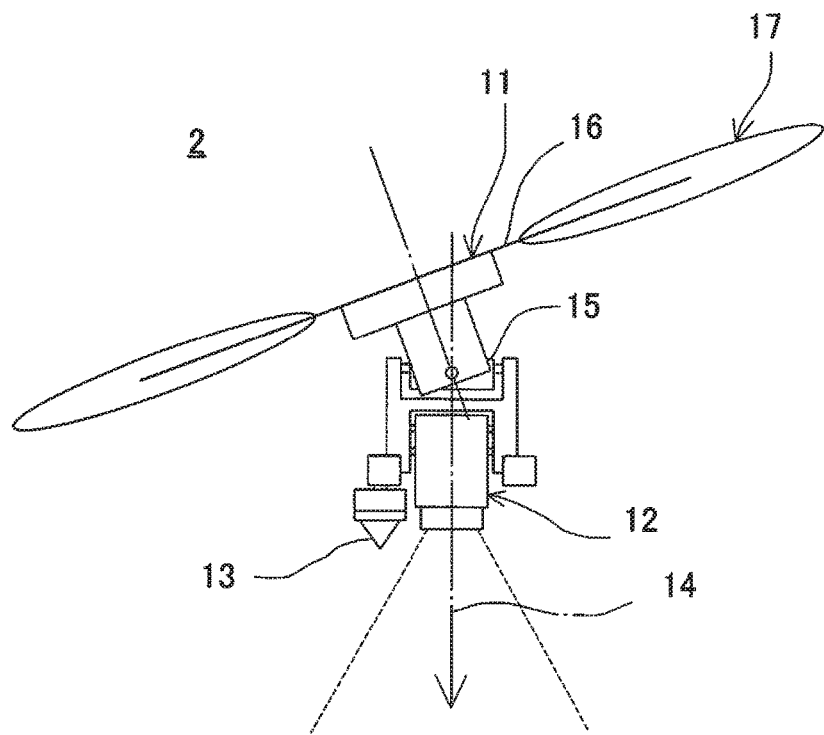
FIG. 2 is a schematical drawing of a UAV measuring apparatus in the embodiment.

A description will be given on the UAV measuring apparatus 2 by referring to FIG. 2.

The measuring device 12 is provided to the flying vehicle 11 via the gimbal mechanism 15 in such a manner that the measuring device 12 can freely tilt, and is driven by a motor (not shown) so that a reference optical axis 14 of the measuring device 12 is directed in an approximately vertically downward direction.

The flying vehicle 11 has a plurality of (preferably, even-numbered) propeller frames 16 which radially extend, and a propeller unit 17 is provided at a tip of each propeller frame 16 respectively.

The propeller unit 17 is constituted of a propeller motor disposed at the tip of the propeller frame 16 and a propeller which is rotated by the propeller motor, the propeller unit 17 can be individually controlled, the propeller is rotated by the propeller motor and thus, the flying vehicle 11 flies.

The prism 13 is provided so as to face downward, and has an optical characteristic of retro-reflecting light which enters from an entire lower range of the prism 13. Further, a retro-reflective optical component, for instance, a reflection seal or reflection sheet may be provided in place of the prism 13. Further, the prism 13, for instance, a reflection reference point of the prism 13 and the measurement reference point have a predetermined relationship (not shown).

Figure 3:
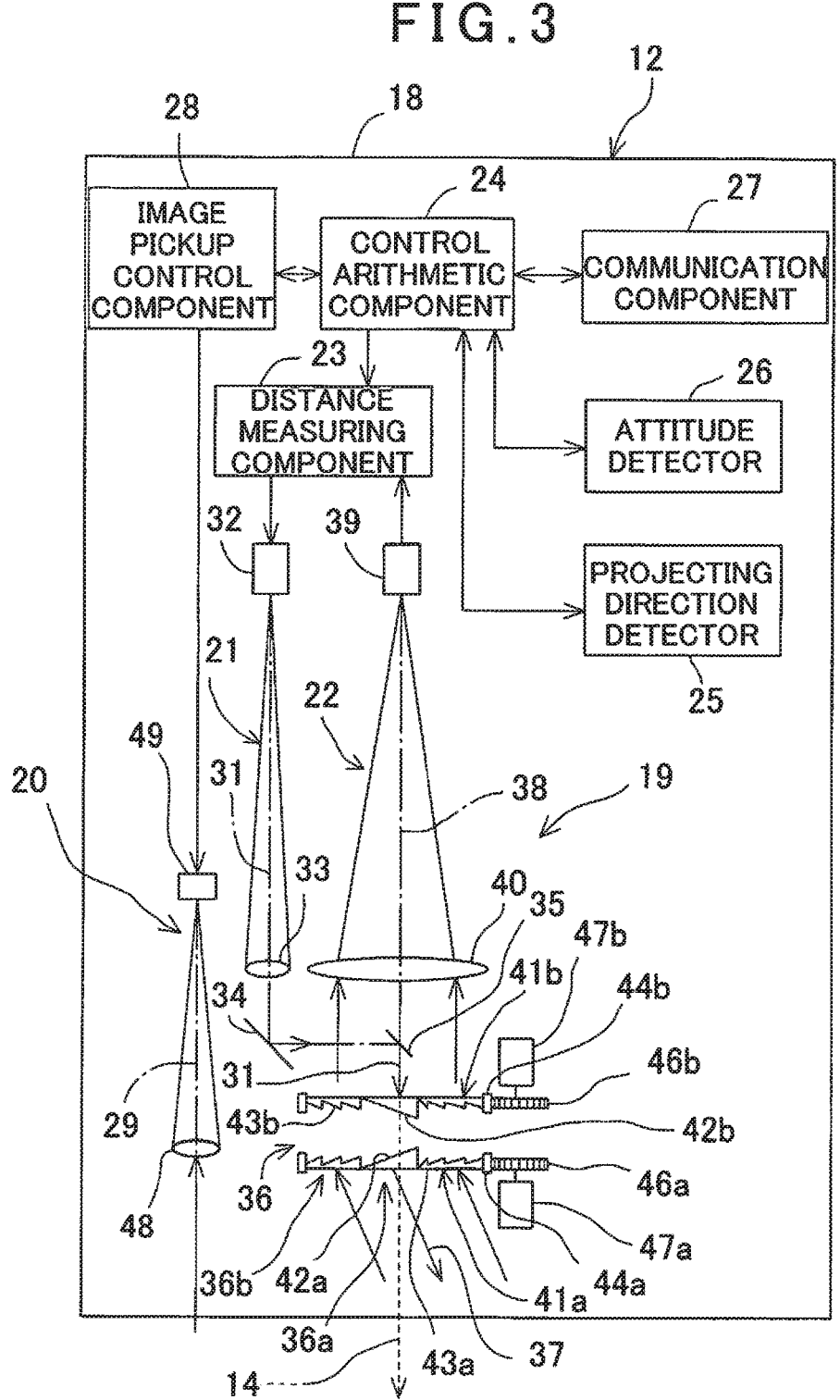
FIG. 3 is a schematical block diagram of a measuring device in the embodiment.
Figure 4:
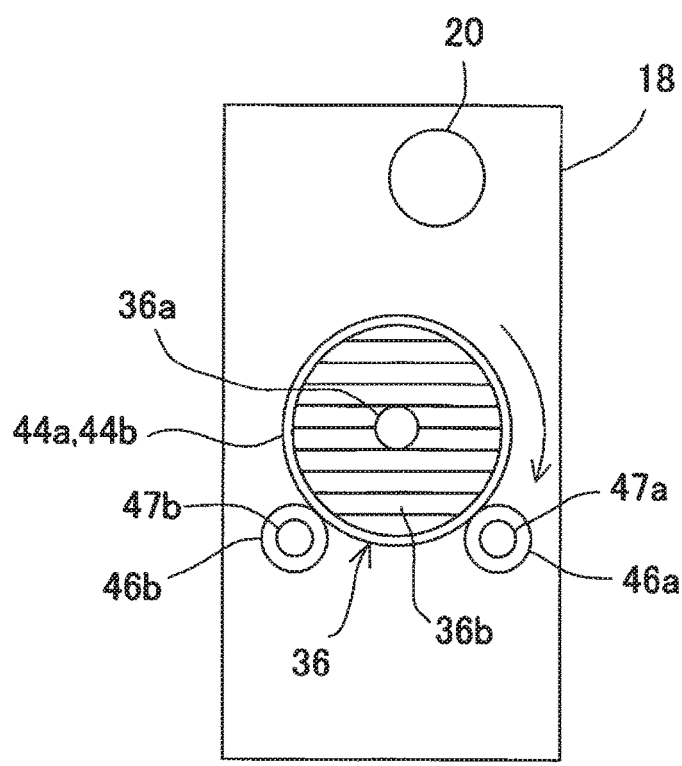
FIG. 4 is a lower surface view of the measuring device.

A further description will be given on the measuring device 12 by referring to FIG. 3 and FIG. 4.

In a casing 18, a laser scanner 19, and an image pickup unit 20, a control arithmetic component 24, a projecting direction detector 25, an attitude detector 26, a communication component 27 and an image pickup control component 28 are accommodated.

The communication component 27 receives an instruction concerning a measurement transmitted from the remote controller 5, inputs the instruction to the control arithmetic component 24 and transmits acquired image data to the remote controller 5.

The image pickup control component 28 issues an image pickup instruction to the image pickup unit 20, and performs a control with respect to an image acquisition such as an image pickup interval, an image pickup timing, or the like.

The laser scanner 19 includes a distance measuring light projecting unit 21, a light receiving unit 22 and a distance measuring component 23. The laser scanner 19 has a reference position of a measurement, and the reference position has a know relationship with the measurement reference point, for instance, the reference position and the measurement reference point are same.

The distance measuring light projecting unit 21 projects a distance measuring light. The distance measuring light projecting unit 21 has a projection optical axis 31, a light emitting element 32, e.g., a laser diode (LD) is provided on the projection optical axis 31 and a projection lens 33 is provided on the projection optical axis 31.

Further, a first reflection mirror 34 and a second reflection mirror 35 are arranged as deflection optical components in such a manner that the projection optical axis 31 coincides with a light receiving optical axis 38 (to be described later).

The light receiving unit 22 receives a reflected distance measuring light from an object to be measured. The light receiving unit 22 has the light receiving optical axis 38, and its extension line becomes the reference optical axis 14 of the measuring device 12.

A light receiving element 39, e.g., a photodiode (PD) is provided on the light receiving optical axis 38, and a focus lens 40 is arranged. The focus lens 40 focuses a reflected distance measuring light on the light receiving element 39. The light receiving element 39 receives the reflected distance measuring light and produces a light receiving signal. The light receiving signal is input to the distance measuring component 23.

Further, an optical axis deflecting unit 36 is arranged on the light receiving optical axis 38 and on an object side of the focus lens 40.

The distance measuring component 23 controls the light emitting element 32 and makes a laser beam to emit as the distance measuring light. The distance measuring light is deflected by the optical axis deflecting unit 36 (a distance measuring light deflecting unit 36a (to be described later)) so as to direct toward a measuring point.

The reflected distance measuring light reflected from the object to be measured enters the light receiving unit 22 through the optical axis deflecting unit 36 (a reflected distance measuring light deflecting unit 36b (to be described later)) and the focus lens 40. The reflected distance measuring light deflecting unit 36b again deflects a distance measuring optical axis 37 deflected by the distance measuring light deflecting unit 36a so that the distance measuring optical axis 37 returns to its original state, and the reflected distance measuring light is received by the light receiving element 39.

The light receiving element 39 sends out a light receiving signal to the distance measuring component 23, and the distance measuring component 23 performs a distance measuring at a measuring point (a point irradiated by the distance measuring light) based on the light receiving signal from the light receiving element 39.

The control arithmetic component 24 includes an input/output control component, an arithmetic component (a CPU), a storage component, or the like. In the storage component, various types of programs are stored. These programs include: a distance measuring program for controlling a distance measuring operation, a control program for controlling driving of the motors 47a and 47b (to be described later), an image processing program for performing an image processing, e.g., an image-matching or the like, an input/output control program, a direction angle arithmetic program for calculating a direction angle (a horizontal angle, a vertical angle) of the distance measuring optical axis 37 based on an arithmetic result (to be described later) of a projecting direction from the projecting direction detector 25, and the like, and further in the storage component, the measurement results such as distance measurement data, image data, or the like, are stored.

The attitude detector 26 detects an attitude (a tilt angle, a tilt direction) of the measuring device 12 with respect to a verticality or a horizontality. A detection result is input to the control arithmetic component 24.

Next, the image pickup unit 20 is an image acquiring means which acquires an image including a measurement range, and has an image pickup optical axis 29. The image pickup optical axis 29 is set in such a manner that the image pickup optical axis 29 becomes parallel to the reference optical axis 14. A focus lens 48 and an image pickup element 49 are arranged on the image pickup optical axis 29.

A field angle of the image pickup unit 20 is set in such a manner that the field angle of the image pickup unit 20 is equivalent to or slightly larger than a range in which the optical axis is deflected by the optical axis deflecting unit 36, and the field angle of the image pickup unit 20 is, e.g., 40°.

Further, the image pickup element 49 is a CCD or a CMOS sensor which is an aggregate of pixels, and a position of a signal from each pixel can be specified on an image element.

For example, a position of each pixel is specified in a coordinates system in which the image pickup optical axis 29 of a camera is an origin point.

A description will be given on the optical axis deflecting unit 36.

In the optical axis deflecting unit 36, a pair of optical prisms 41a and 41b are arranged. The optical prisms 41a and 41b are designed in a disk-like shape respectively, arranged orthogonal to the light receiving optical axis 38, overlapped, and arranged parallel to each other. As each of the optical prisms 41a and 41b, using a Fresnel prism is preferable for miniaturizing the apparatus.

A central portion of the optical axis deflecting unit 36 is designed as the distance measuring light deflecting unit 36a through which the distance measuring light is transmitted, and a portion except the central portion of the optical axis deflecting unit 36 is designed as the reflected distance measuring light deflecting unit 36b.

The Fresnel prisms used as the optical prisms 41a and 41b are constituted of prism elements 42a and 42b, and many prism elements 43a and 43b arranged parallel to each other respectively, and have a plate-like shape. The optical prisms 41a and 41b, the each prism elements 42a and 42b and the each prism elements 43a and 43b have the same optical characteristics.

The prism elements 42a and 42b constitute the distance measuring light deflecting unit 36a, and the prism elements 43a and 43b constitute the reflected distance measuring light deflecting unit 36b.

The Fresnel prisms may be manufactured by an optical glass, or the Fresnel prism may be molded by using an optical plastic material. By molding the Fresnel prism by using the optical plastic material, a low cost Fresnel prisms can be manufactured.

The optical prisms 41a and 41b are arranged in such a manner that the optical prisms 41a and 41b can individually rotate with the light receiving optical axis 38 (i.e., the reference optical axis 14) as the center, respectively. By independently controlling rotation directions, rotation amounts and rotation speeds, the optical prisms 41a and 41b deflect the distance measuring optical axis 37 of the distance measuring light as emitted in an arbitrary deflecting direction, and deflect the light receiving optical axis 38 of the reflected distance measuring light as received in parallel to the distance measuring optical axis 37.

An outer shape of each of the optical prisms 41a and 41b is designed as a circle-plate shape with the light receiving optical axis 38 as the center. Taking an expansion of the reflected distance measuring light into consideration, diameters of the optical prisms 41a and 41b are set so that a sufficient light amount can be obtained.

A ring gear 44a is fitted with an outer periphery of the optical prism 41a, and a ring gear 44b is fitted with an outer periphery of the optical prism 41b.

A driving gear 46a meshes with the ring gear 44a, and the driving gear 46a is fixed to an output shaft of the motor 47a. A driving gear 46b meshes with the ring gear 44b, and the driving gear 46b is fixed to an output shaft of the motor 47b. The motors 47a and 47b are electrically connected to the control arithmetic component 24.

As the motors 47a and 47b, a motor which can detect a rotation angle or a motor which rotates corresponding to a driving input value, for instance, a pulse motor is used.

Alternatively, by using a rotation angle detector which detects a rotation amount (a rotation angle) of a motor, e.g., an encoder (not shown) or the like, the rotation amount of each motor may be detected. Based on detection results of the projecting direction detector 25, the motors 47a and 47b are individually controlled by the control arithmetic component 24.

The driving gears 46a and 46b and the motors 47a and 47b are provided at positions not interfering with the distance measuring light projecting unit 21, for instance, on a lateral sides of the ring gears 44a and 44b.

The projection lens 33, the distance measuring light deflecting unit 36a, or the like make up a projection optical system, and the reflected distance measuring light deflecting unit 36b, the focus lens 40, or the like make up a light receiving optical system.

The projecting direction detector 25 counts driving pulses input to the motors 47a and 47b, and detects the rotation angles of the motors 47a and 47b, or detects the rotation angles of the 47a and 47b based on signals from encoders. It is to be noted that it may be so arrange that the encoders (not shown) are connected with the ring gears 44a and 44b respectively, and the rotation angles of the ring gears 44a and 44b are directly detected by the encoders.

Further, the projecting direction detector 25 calculates rotating positions of the optical prisms 41a and 41b based on the rotation angles of the motors 47a and 47b and calculates a deflection angle (a deflecting direction) and a projecting direction of the distance measuring light based on a refractive index and the rotating positions of the distance measuring light deflecting unit 36a (i.e., the prism elements 42a and 42b), and the arithmetic results are input to the control arithmetic component 24.

A description will be given on a deflecting action provided by the optical axis deflecting unit 36 by referring to FIG. 5A, FIG. 5B and FIG. 5C.

Figure 5A:
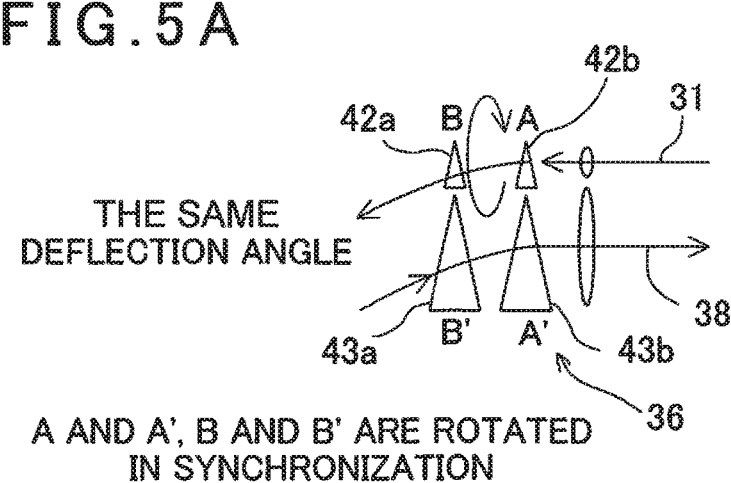
FIG. 5A, FIG. 5B and FIG. 5C are explanatory drawings showing a deflecting action of an optical axis deflecting unit of the measuring device.

It is to be noted that, in order to simplify a description, FIG. 5A shows that the prism elements 42a and 42b are separated from the prism elements 43a and 43b in the optical prisms 41a and 41b. Further, the prism elements 42a and 42b and the prism elements 43a and 43b shown in FIG. 5A are in a state where a maximum deflection angle can be obtained. Further, a minimum deflection angle corresponds to a position where any one of the optical prisms 41a and 41b is rotated by 180°, the deflection angle becomes 0°, and an optical axis (i.e., the distance measuring optical axis 37) of a laser beam to be projected coincides with the reference optical axis 14.

A distance measuring light is emitted from the light emitting element 32, and the distance measuring light is turned to a parallel luminous flux by the projection lens 33 and is projected toward the object to be measured or measurement target area through the distance measuring light deflecting unit 36a (the prism elements 42a and 42b). Here, by passing through the distance measuring light deflecting unit 36a, the distance measuring light is deflected in a direction as required by the prism elements 42a and 42b and is projected.

A reflected distance measuring light as reflected by the object to be measured or the measurement target area is entered through the reflected distance measuring light deflecting unit 36b, passes through the optical axis deflecting unit 36, and is focused on the light receiving element 39 by the focus lens 40.

When the reflected distance measuring light passes through the reflected distance measuring light deflecting unit 36b, an optical axis of the reflected distance measuring light is deflected by the prism elements 43a and 43b so as to coincide with the light receiving optical axis 38 (FIG. 5A).

By combining a rotational position of the optical prism 41a and a rotational position of the optical prism 41b, a deflecting direction and a deflection angle of the distance measuring light to be projected can be arbitrarily changed.

Further, in a state where a positional relationship between the optical prism 41a and the optical prism 41b is fixed (in a state where a deflection angle obtained by the optical prism 41a and the optical prism 41b is fixed), when the optical prism 41a and the optical prism 41b are integrally rotated by the motors 47a and 47b, a locus drawn by the distance measuring light passing through the distance measuring light deflecting unit 36a becomes a circle with the reference optical axis 14 as the center.

Therefore, when the optical axis deflecting unit 36 is rotated while emitting the laser beam from the light emitting element 32, the distance measuring light can be scanned by circular locus. It is to be noted that the reflected distance measuring light deflecting unit 36b rotates integrally with the distance measuring light deflecting unit 36a as a matter of course.

Figure 5B:
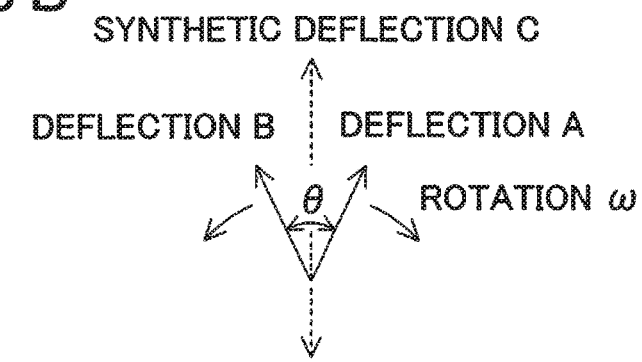

Next, FIG. 5B shows a case where the optical prism 41a and the optical prism 41b are relatively rotated. Assuming that a deflecting direction of an optical axis as deflected by the optical prism 41a is a deflection "A" and a deflecting direction of an optical axis as deflected by the optical prism 41b is a deflection "B", a deflection of the optical axes by the optical prisms 41a and 41b becomes a synthetic deflection "C" as an angle difference θ between the optical prisms 41a and 41b.

Therefore, in a case where the optical prism 41a and the optical prism 41b are synchronized in opposite directions and reciprocally rotated at a constant speed and at an equal angle, the distance measuring light passing through the optical prisms 41a and 41b is linearly scanned. Therefore, when the optical prisms 41a and 41b are reciprocally rotated at the constant speed and at the equal angle in the opposite directions, as shown in FIG. 5B, the distance measuring light can be made to reciprocally scan in a direction of the synthetic deflection C with a linear locus 50.

Figure 5C:
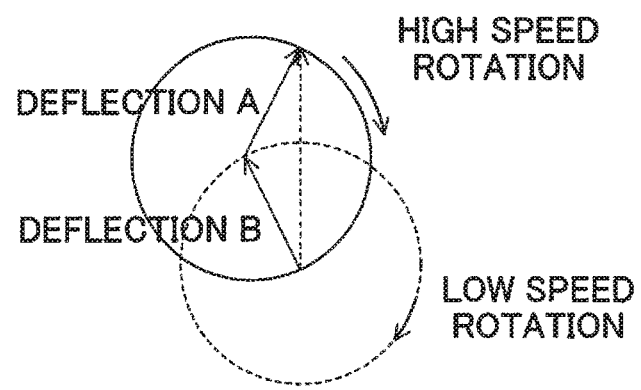

Further, as shown in FIG. 5C, when the optical prism 41b is rotated at a rotating speed lower than a rotating speed of the optical prism 41a, since the distance measuring light is rotated while the angle difference θ gradually increasing, a scanning locus of the distance measuring light has a spiral form.

Furthermore, by individually controlling the rotating directions and the rotating speeds of the optical prism 41a and the optical prism 41b, various kinds of scanning states, or the like can be obtained, for instance, a scanning state where the scanning locus of the distance measuring light is formed in an irradiating direction (the scanning in a radial direction) with the reference optical axis 14 as the center, or in a horizontal direction, or in a vertical direction.

As a measurement mode, when the optical axis deflecting unit 36 (the optical prisms 41a and 41b) is fixed at every deflection angle as required and the distance measurement is performed, the distance measurement with respect to a specific measuring point can be performed. Further, by performing the distance measurement while changing the deflection angle of the optical axis deflecting unit 36, the distance measuring light in a pattern as required can be scanned, and further by performing the distance measurement while scanning, point cloud distance measurement data (scanning data) can be obtained along the scanning locus.

Further, a projecting direction angle of each distance measuring light can be detected by detecting the rotational positions of the optical prisms 41a and 41b or by detecting the rotation angles of the motors 47a and 47b. Further, when the projecting direction angle is associated with the distance measurement data, three-dimensional distance measurement data can be obtained.

Therefore, the laser scanner 19 can function as a laser scanner which obtains three-dimensional point cloud data.

Further, when the relative rotation speeds and the rotation directions of the optical prisms 41a and 41b are appropriately controlled, it is possible to perform the scanning in various kinds of modes, for instance, linearly (one-dimensionally) scanning the laser beam, two-dimensional scanning the laser beam, scanning the laser beam so as to form a closed loop, or the like.

Figure 6:
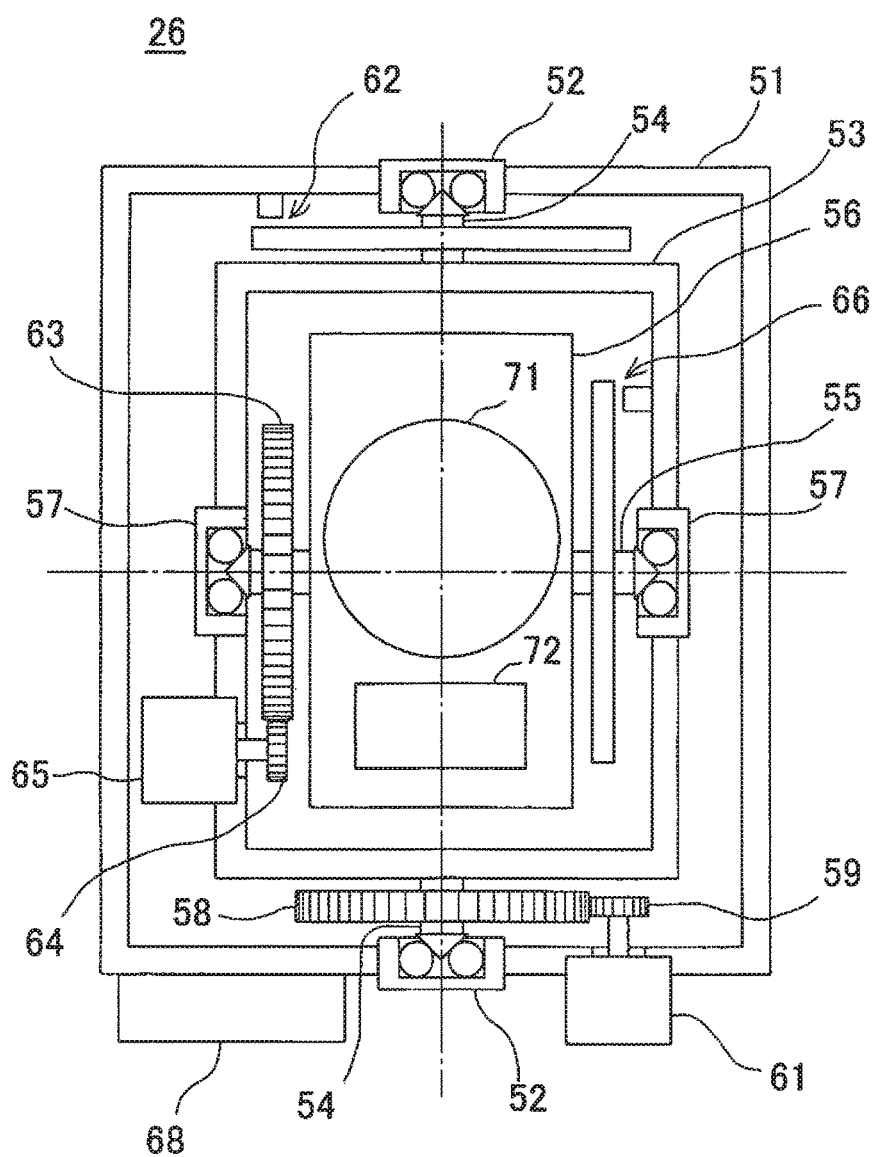
FIG. 6 is a plan view of an attitude detector included in the measuring device.
Figure 7:
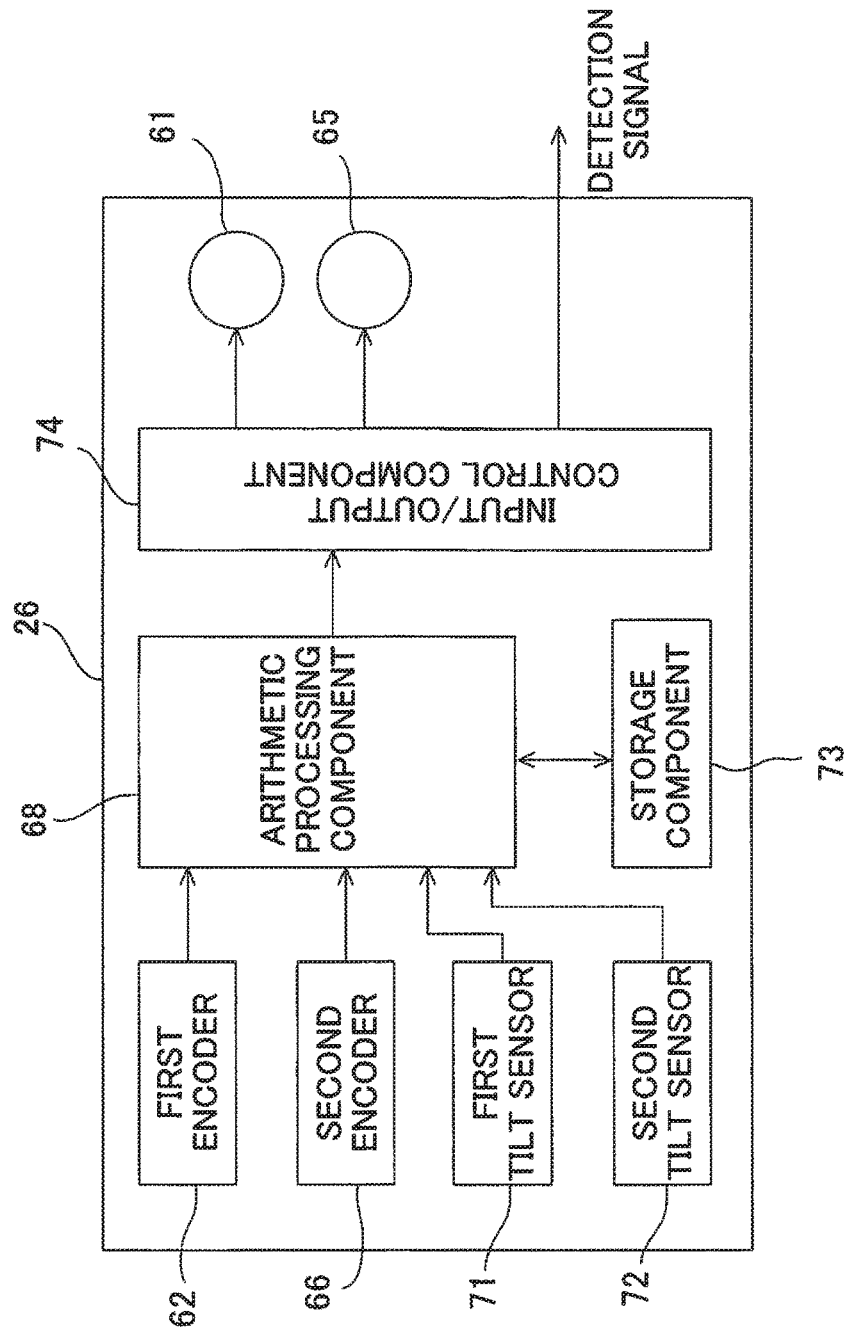
FIG. 7 is a schematical block diagram of the attitude detector.

Next, a detailed description will be given on the attitude detector 26 by referring to FIG. 6 and FIG. 7. It is to be noted that FIG. 6 shows a plan view and, in the following description, upper and lower sides correspond to upper and lower sides in the drawings and left and right sides correspond to left and right sides in the drawings.

Inside an outer frame 51 with a rectangular frame shape, an inner frame 53 with a rectangular frame shape is provided, and inside the inner frame 53, a tilt detecting unit 56 is provided.

From an upper surface and a lower surface of the inner frame 53, longitudinal shafts 54 and 54 are protruded. The longitudinal shafts 54 and 54 are rotatably fitted with bearings 52 and 52 as provided on the outer frame 51. The longitudinal shafts 54 and 54 have a longitudinal axis, and the inner frame 53 is capable of rotating freely by 360° in a left-and-right direction around the longitudinal shafts 54 and 54 as the center.

The tilt detecting unit 56 is supported by a lateral shaft 55, and both the end portions of the lateral shaft 55 are rotatably fitted with bearings 57 and 57 as provided on the inner frame 53. The lateral shaft 55 has a lateral axis perpendicularly crossing the longitudinal axis, and the tilt detecting unit 56 is capable of rotating freely by 360° in an up-and-down direction around the lateral shaft 55 as the center.

That is, the tilt detecting unit 56 is configured so as to be supported via a gimbal mechanism, which is capable of rotating fleely by 360° in two axis directions with respect to the outer frame 51.

A first gear 58 is attached on one of the longitudinal shafts 54 and 54, for instance, to longitudinal shaft 54 on the lower side, and the first gear 58 meshes with a first driving gear 59. Further, a first motor 61 is provided on a lower surface of the outer frame 51, and the first driving gear 59 is attached to an output shaft of the first motor 61.

On the other of the longitudinal shafts 54 and 54, a first encoder 62 is attached. The first encoder 62 is configured so as to detect a rotation angle in the left-and-right direction of the inner frame 53 with respect to the outer frame 51.

A second gear 63 is attached on one end of the lateral shaft 55, and a second driving gear 64 meshes with the second gear 63. Further, a second motor 65 is attached on a side surface (a left side surface in the drawing) of the inner frame 53, and the second driving gear 64 is attached to an output shaft of the second motor 65.

A second encoder 66 is attached on the other end of the lateral shaft 55. The second encoder 66 is configured so as to detect a rotation angle in the up-and-down direction of the tilt detecting unit 56 with respect to the inner frame 53.

The first encoder 62 and the second encoder 66 are electrically connected to an arithmetic processing component 68.

The tilt detecting unit 56 has a first tilt sensor 71 and a second tilt sensor 72, and the first tilt sensor 71 and the second tilt sensor 72 are electrically connected to the arithmetic processing component 68.

A further description will be given on the attitude detector 26 by referring to FIG. 7.

The attitude detector 26 comprises the first encoder 62, the second encoder 66, the first tilt sensor 71, the second tilt sensor 72, the arithmetic processing component 68, the first motor 61 and the second motor 65. Further, the attitude detector 26 comprises a storage component 73 and an input/output control component 74.

In the storage component 73, programs such as a calculation program for an attitude detection and the like, and data such as calculation data and the like are stored.

The input/output control component 74 drives the first motor 61 and the second motor 65 based on a control instruction output from the arithmetic processing component 68 and outputs a tilt detection result calculated by the arithmetic processing component 68 as a detection signal.

The first tilt sensor 71 is for detecting the horizontality with high accuracy, for instance, a tilt detector in which a detection light incidents to a horizontal liquid surface and horizontality is detected according to a change of a reflection angle of a reflected light, or a bubble tube which detects a tiling according to a positional change of an air bubble sealed in a tube. Further, the second tilt sensor 72 is for detecting a tilt change with high responsiveness, for instance, an acceleration sensor.

It is to be noted that both the first tilt sensor 71 and the second tilt sensor 72 can individually detect tilting in the two axis directions, which are a rotating direction (a tilting direction) detected by the first encoder 62 and a rotating direction (a tilting direction) detected by the second encoder 66.

The arithmetic processing component 68 calculates a tilt angle and a tilting direction based on detection results from the first tilt sensor 71 and the second tilt sensor 72. Further, the arithmetic processing component 68 calculates a tilt angle of the measuring device 12 with respect to a verticality (or a horizontality) based on a rotation angle of the first encoder 62 and a rotation angle of the second encoder 66, which correspond to the tilt angle and the tilting direction.

It is to be noted that the attitude detector 26 is set in such a manner that the first tilt sensor 71 detects the horizontality in a case where the outer frame 51 is horizontally installed, and also set in such a manner that both an output from the first encoder 62 and an output from the second encoder 66 indicate a reference position (a rotation angle 0°).

A description will be given below on an action of the attitude detector 26.

First, a description will be given on a case where a tilt is detected with high accuracy.

The case where a tilt is detected with high accuracy is, for instance, a static case or a case where a change of tilting is slow as the first tilt sensor 71 can follow the change of tilting.

When the attitude detector 26 tilts, the first tilt sensor 71 outputs a signal corresponding to a tilting.

The arithmetic processing component 68 calculates a tilt angle and a tilting direction based on the signal from the first tilt sensor 71 and calculates the rotation amounts of the first motor 61 and the second motor 65 in order to make the tilt angle and the tilt direction 0 based on a calculation result. The arithmetic processing component 68 issues a driving command for driving the first motor 61 and the second motor 65 by the rotation amounts via the input/output control component 74.

The first motor 61 and the second motor 65 are driven so as to be tilted oppositely to the calculated tilt angle and tilting direction by drivings of the first motor 61 and the second motor 65. Rotation amounts (the rotation angles) of the motors are detected by the first encoder 62 and the second encoder 66, and when the rotation angles reach the calculation results, the drivings of the first motor 61 and the second motor 65 are stopped.

In this state, the tilt detecting unit 56 is horizontally controlled while the outer frame 51 is tilting.

Therefore, the tilt angle and the tilt direction, at which the inner frame 53 and the tilt detecting unit 56 are tilted by the first motor 61 and the second motor 65 in order to make the tilt detecting unit 56 horizontal, are obtained based on the rotation angles as detected by the first encoder 62 and the second encoder 66.

The arithmetic processing component 68 calculates a tilt angle and a tilting direction of the attitude detector 26 based on the detection results of the first encoder 62 and the second encoder 66 when the first tilt sensor 71 detects the horizontality. The calculation result indicates an attitude of the attitude detector 26 after the attitude detector 26 is tilted.

The arithmetic processing component 68 outputs the calculated tilt angle and tilting direction to an outside via the input/output control component 74 as a detection signal of the attitude detector 26.

In the attitude detector 26, as a structure shown in FIG. 6, there is nothing which restricts rotations of the tilt detecting unit 56 and the inner frame 53. Therefore, the tilt detecting unit 56 and the inner frame 53 can both rotate by 360° or more. That is, no matter what attitude the attitude detector 26 takes (for instance, even in a case where the attitude detector 26 is upside down), the attitudes detection in all directions can be performed.

In the attitude detection, in a case where the high responsiveness is required, the attitude detection and the attitude control are carried out based on a detection result of the second tilt sensor 72, but a detection accuracy of the second tilt sensor 72 is generally poorer than a detection accuracy of the first tilt sensor 71.

In the attitude detector 26, since the first tilt sensor 71 with high accuracy and the second tilt sensor 72 with high responsiveness are provided, it becomes possible to carry out the attitude control based on a detection result of the second tilt sensor 72, and to carry out the attitude detection with high accuracy by the first tilt sensor 71.

That is, based on a tilt angle as detected by the second tilt sensor 72, the first motor 61 and the second motor 65 are driven so that the tilt angle becomes 0°. Further, by continuing the driving of the first motor 61 and the second motor 65 until the first tilt sensor 71 detects the horizontality, the attitude can be detected with high accuracy. If a deviation occurs between values of the first encoder 62 and the second encoder 66 when the first tilt sensor 71 detects the horizontality, i.e., between an actual tilt angle and a tilt angle as detected by the second tilt sensor 72, the tilt angle of the second tilt sensor 72 can be calibrated based on the deviation.

Therefore, if a relationship between a detected tilt angle of the second tilt sensor 72 and a tilt angle which is obtained based on the horizontal detection by the first tilt sensor 71 and on the detection results of the first encoder 62 and the second encoder 66 in advance, the tilt angle detected by the second tilt sensor 72 can be calibrated. Therefore, accuracy of the attitude detection with high responsiveness by the second tilt sensor 72 can be improved.

Further, when a fluctuation in tilting is large or a change in tilting is fast, the arithmetic processing component 68 controls the first motor 61 and the second motor 65 based on a signal from the second tilt sensor 72. Further, when a fluctuation in tilting is small or a change in tilting is moderate, that is to say, in a state where the first tilt sensor 71 can follow the fluctuation and the change in tilting, the arithmetic processing component 68 controls the first motor 61 and the second motor 65 based on a signal from the first tilt sensor 71.

It is to be noted that the storage component 73 stores comparison data which is a data table showing a comparison result of a detection result of the first tilt sensor 71 and a detection result of the second tilt sensor 72. In a case where the first motor 61 and the second motor 65 are controlled based on a signal from the second tilt sensor 72, the arithmetic processing component 68 calibrates the detection result provided by the second tilt sensor 72 based on the comparison data. By this calibration, it is possible to improve the detection result provided by the second tilt sensor 72 to the detection accuracy of the first tilt sensor 71. Thus, in the attitude detection performed by the attitude detector 26, a high responsiveness can be realized while maintaining a high accuracy.

By synthesizing the calculated rotation angle of the first encoder 62 and the calculated rotation angle of the second encoder 66, a tilt angle and a tilting direction are calculated in a real time. The tilt angle and the tilting direction correspond to a tilt angle and a tilting direction of the measuring device 12 as the attitude detector 26 attached thereto with respect to a verticality (or a horizontality).

Figure 8:
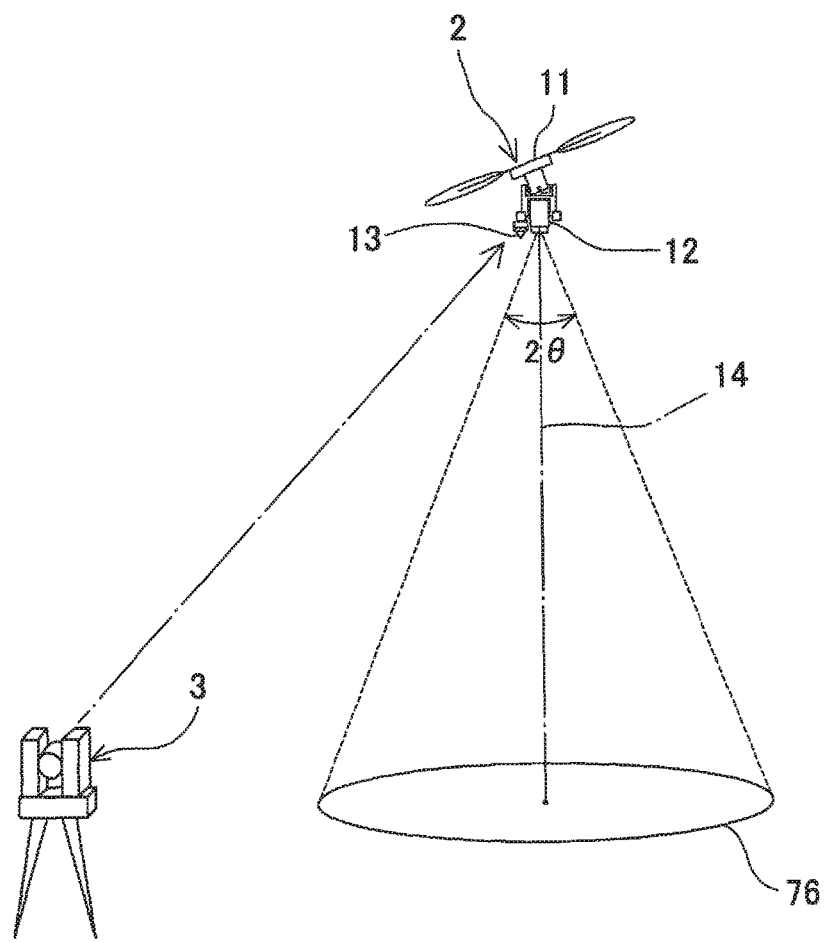
FIG. 8 is an explanatory drawing showing a measurement state of the present embodiment.

A description will be given on an action of a measurement according to the present embodiment by referring to FIG. 8. In the measurement shown in FIG. 8, during a flight of the UAV measuring apparatus 2 in a measurement range, a distance measuring light as projected from the measuring device 12 is scanned in a circular shape (hereinafter, referred as a circular scanning) for measuring.

First, a deflection angle $\theta$ in case of performing the circular scanning is designated from the remote controller 5. Further, the deflection angle $\theta$ is transmitted to the measuring device 12 and also input to the ground base station 4.

The control arithmetic component 24 drives the optical axis deflecting unit 36 based on the received deflection angle $\theta$. The optical axis deflecting unit 36 sets a relative angle between the optical prisms 41a and 41b so that the deflection angle becomes $\theta$ with respect to the reference optical axis 14. After setting, by integrally rotating the optical prisms 41a and 41b, the circular scanning is realized.

In a case where the circular scanning is performed, a scanning locus 76 of an irradiation point of a laser beam on a ground becomes a circle which is a closed loop, and a locus of the laser beam itself is a conical shape of which a vertex is the optical axis deflecting unit 36 and its vertical angle is $2\theta$.

The deflection angle $\theta$ is set while considering an altitude of the UAV measuring apparatus 2 and a field angle of the image pickup unit 20.

The UAV measuring apparatus 2 is flown based on a flight plan set in advance.

The total station 3 is installed at a known point, and the total station 3 tracks and measures the prism 13 of the flying UAV measuring apparatus 2.

As described above, the measuring device 12 is supported by the gimbal mechanism 15, and the measuring device 12 takes an approximately vertical attitude, that is to say, the reference optical axis 14 is approximately vertical when a rapid external force does not act on the measuring device 12. Further, since the prism 13 is integrated with the measuring device 12 and has a predetermined relationship with a measurement reference point of the measuring device 12, when the total station 3 measures a position of the prism 13, a position (a three-dimensional coordinates) of the measuring device 12 can be immediately determined.

The position of the measuring device 12 is transmitted to the ground base station 4, the ground base station 4 calculates a flight control instruction based on the obtained position of the measuring device 12 and the flight plan, and a calculated instruction is transmitted to the measuring device 12 from the remote controller 5 and the flight of the UAV measuring apparatus 2 is controlled.

During the flight of the UAV measuring apparatus 2, the measuring device 12 performs the circular scanning, obtains point cloud data on a circular locus and transmits the obtained point cloud data to the ground base station 4 via the remote controller 5.

The reference optical axis 14 of the measuring device 12 is approximately vertical, the deflection angle $\theta$ of the distance measuring light is already known, and the position of the measuring device 12 at the time of the measurement (i.e., the position of the measurement reference point) is also already known by the measurement of the total station 3.

The measurement results by the circular scanning are a deflection angle and a direction of the deflection angle with reference to the reference optical axis 14, and a distance value. The deflection angle, the direction of the deflection angle and the distance value can be converted into coordinates system data with reference to the measurement reference point of the measuring device 12. Further, since a tilting of the reference optical axis 14 with respect to the approximate verticality can be detected with high accuracy by the attitude detector 26, the tilting of the reference optical axis can be converted into a coordinates system with reference to the horizontality.

Therefore, each pixel corresponding to the scanning locus 76 on an acquired image can be associated with a horizontal distance and a height or a horizontal distance difference and a height difference, seeing only one image enables grasping the horizontal distance differences and the height differences on the scanning locus 76, and the rough horizontal distance differences and the rough height differences within an entire image can be estimated.

Therefore, in the ground base station 4, the measurement results of the point cloud data obtained by the circular scanning can be immediately converted into three-dimensional data of a ground coordinates system with reference to the installing position of the total station 3.

A tilt angle of the reference optical axis 14 at the time of measuring each point of the point cloud data is obtained from the attitude detector 26. The tilt angle of the reference optical axis 14 is associated with a measurement result of each point provided by the measuring device 12, and the point cloud data associated with the tilt angle is transmitted to the ground base station 4 via the remote controller 5.

On the ground base station 4, the data is corrected to point cloud data in which the reference optical axis 14 is approximately vertical based on the tilt angle and further converted into three-dimensional data with reference to the installing position of the total station 3.

Therefore, irrespective of an attitude of the measuring device 12, the accurate point cloud data can be obtained with reference to the installing position of the total station 3.

Next, an image at the time of the measurement performed by the measuring device 12 is acquired by the image pickup unit 20. It is to be noted that the image pickup optical axis 29 of the image pickup unit 20 is parallel to the reference optical axis 14, a relationship between both the optical axes is already known, and hence it is easy to associate the acquired image and the point cloud data obtained by the circular scanning.

Further, a measurement timing of each point of the point cloud data is controlled (measured) based on a clock signal of the control arithmetic component 24, and the image pickup control component 28 controls an image pickup timing based on the clock signal of the control arithmetic component 24. Therefore, at which point the image acquisition is performed in the point cloud data can be easily associated based on the clock signal. It is to be noted that a scanning start and an image pickup may be synchronized with each other by a synchronization signal. Including the association based on the clock signal and the synchronization using the synchronization signal will be referred as the synchronization hereinafter.

That is, an image acquiring position by the image pickup unit 20 can be accurately associated with the point cloud data. Further, the deflection angle and the deflecting direction with reference to the reference optical axis 14 at the time of the distance measurement by the distance measuring light are detected by the projecting direction detector 25, and the deflection angle and the deflecting direction are corresponded with a position of each pixel of the light receiving element 39, and hence the scanning locus 76 can be corresponded with each pixel in the image.

A description will be given on an acquisition of the point cloud data and an acquisition of an image during flight (during movement) by referring to FIG. 9 and FIG. 10.

Figure 9:
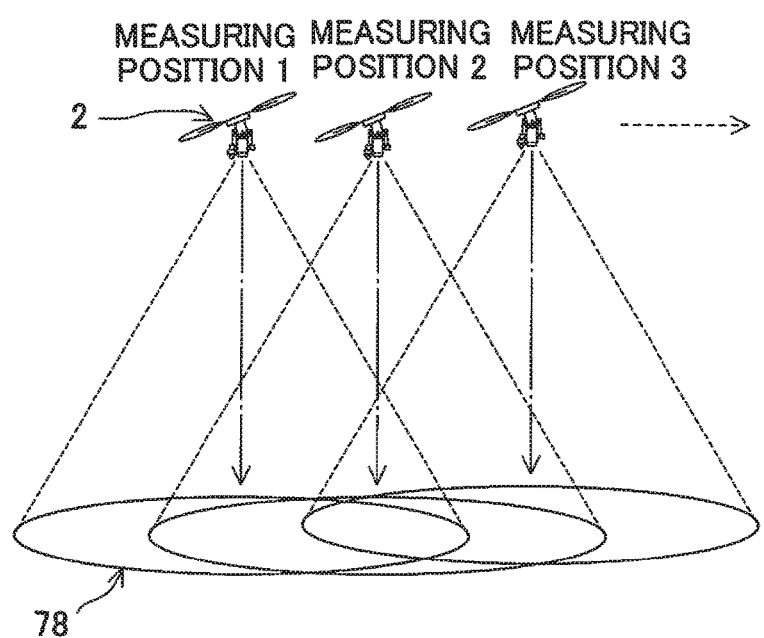
FIG. 9 is an explanatory drawing showing a measurement state during flight of a flying vehicle.

FIG. 9 shows a state where the circular scanning and the acquisition of an image are performed at a measuring position 1, a measuring position 2 and a measuring position 3, respectively. Here, point cloud data obtained by the single circular scanning will be referred as circular point cloud data 78 hereinafter.

Figure 10:
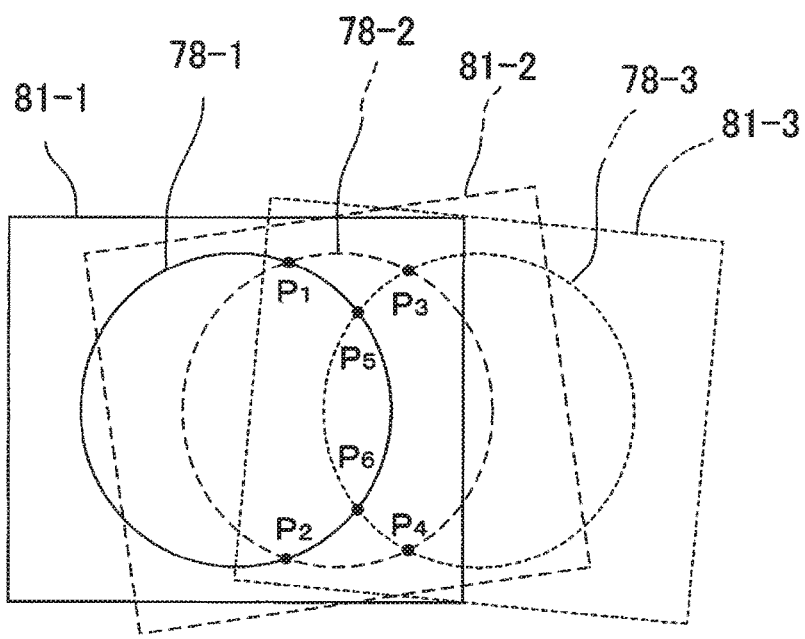
FIG. 10 is a drawing showing a relationship between an image acquired during flight and a scanning locus.

FIG. 10 shows an image 81-1, an image 81-2 and an image 81-3 acquired at the measuring position 1, the measuring position 2 and the measuring position 3, circular point cloud data 78-1, circular point cloud data 78-2 and circular point cloud data 78-3 obtained by the circular scanning.

A plurality of intersection points of the respective scanning loci can be obtained as characteristics of the closed loop scanning. In case of the circular scanning, there are two intersection points with respect to two scanning loci (circular point cloud data 78), and the two intersection points are ensured even if a direction of the flying vehicle 11 is rotated.

In the drawing, the intersection points of the circular point cloud data 78-1 and the circular point cloud data 78-2 are P1 and P2, these intersection points become important connecting points in order to connect two circular point cloud data 78-1 and 78-2 with the two images 81-1 and 81-2 and the connection can be achieved by using the coordinates information (a horizontal distance and a height) of the intersection points.

Likewise, the intersection points of the circular point cloud data 78-2 and the circular point cloud data 78-3 are P3 and P4, and the intersection points of the circular point cloud data 78-1 and the circular point cloud data 78-3 are P5 and P6.

Next, a description will be given on a case where image-matching is performed with respect to an image 81-1 and an image 81-2 acquired at a measuring position 1 and a measuring position 2.

The image 81-1 and the image 81-2 include the circular point cloud data 78-1 and the circular point cloud data 78-2 respectively, the intersection points P1 and P2 of the circular point cloud data 78-1 and the circular point cloud data 78-2 serve as common points in both the images, and further the intersection points P1 and P2 have coordinates values respectively. Therefore, when the coordinates values of the intersection points P1 and P2 are used, a matching between the image 81-1 and the image 81-2 immediately functions as a coordinates connecting.

Likewise, with respect to the image 81-2 and the image 81-3, the intersection points P3 and P4 of the circular point cloud data 78-2 and the circular point cloud data 78-3 are used, with respect to the image 81-1 and the image 81-3, the intersection points P5 and P6 of the circular point cloud data 78-1 and the circular point cloud data 78-3 are used, and the respective coordinates connecting can be performed.

Further, since the coordinates of the measuring position 1, the measuring position 2 and the measuring position 3 are measured by the total station 3, a photogrammetry can be carried out based on the matched images and positional informations of the measuring position 1, the measuring position 2 and the measuring position 3.

P1 to P6 mentioned above are the connecting points, and a position of the measuring position 3 (a current position of the measuring device 12) can be estimated from the measuring position 1 and the measuring position 2 (method of resection).

Therefore, in a case where a position measuring system is interrupted, that is to say, in a case where the total station 3 cannot perform the measurement, a self-position of the flying vehicle 11 can be obtained, which is helpful for safe flight.

Although the above measurement shows a case where the measurement is carried out relatively intermittently, an image with coordinates information (a horizontal distance and a height, or a scanning angle with reference to a verticality and a distance measurement value) can be produced in a real time in a case where a measurement rate is fast (in a case where a circular scanning speed is fast).

Calculations of the horizontal distance and the height can be obtained from the scanning angle (the deflection angle θ with respect to the reference optical axis 14 (see FIG. 8)) with reference to the verticality and the distance measurement value.

On an image obtained in synchronization with the circular scanning, a coordinates information is added to each pixel corresponding to a scanning locus, and the image-matching is performed with a last image, and a coordinates information of the last scanning locus is taken over (transferred) to a new image. When this image-matching and the transfer of the coordinates information are continued for each image acquisition, informations of scanning loci can be integrated to one image, the point cloud density which is sufficient for the measurement of a ground surface shape can be obtained, and an image with a coordinates information can be acquired in a real time (see FIG. 11).

Figure 11:
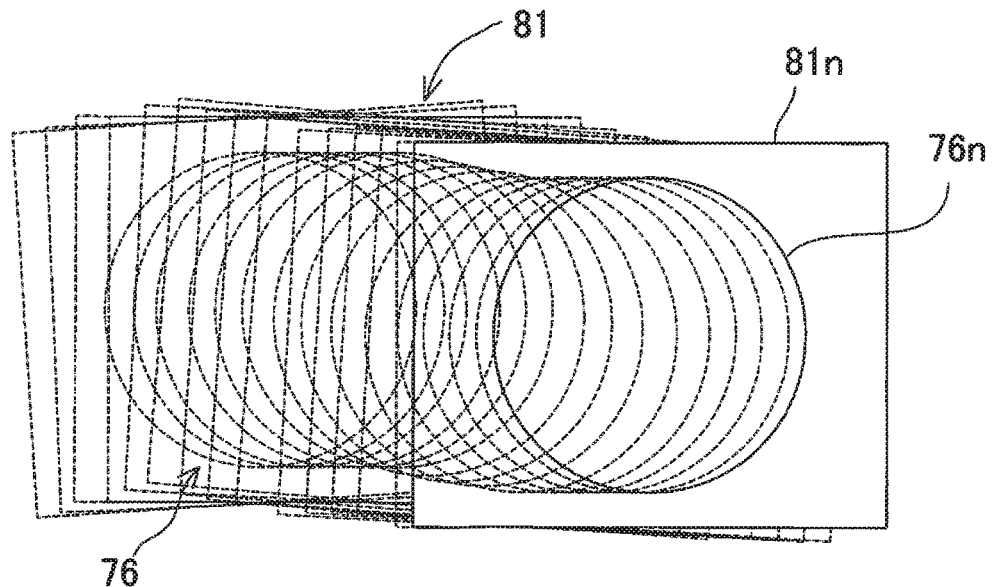
FIG. 11 is an explanatory drawing showing a relationship between an image group acquired over time and scanning data sequentially taken over into the images.

It is to be noted that, in FIG. 11, a reference sign 81n denotes the latest image, and a reference sign 81 denotes an old image. Further, a scanning locus 76n denotes the latest scanning locus, and reference sign 76 denotes an old scanning locus.

When the images with the real-time coordinates information are continuously arranged, a pseudo-photomap along a flight route can be fabricated.

Further, since a self-position of the measuring device 12 can be estimated by using the connecting points of the images with the real-time coordinates information, an expanded pseudo-photomap can be fabricated without a position measuring system, e.g., the total station 3 or the like. Further, the finished pseudo-photomap and the images acquired during the flight of the UAV measuring apparatus 2 are compared, and a position of the UAV measuring apparatus 2 can be confirmed, which is helpful for the safe flight.

At the time of the photographing, in a case where a tilting of the camera directed in an approximately vertically downward direction is large, a projective transformation is performed based on the tilt detected by the attitude detector 26, and the conversion into an orthogonal image directed in an approximately vertically downward direction is performed and a pseudo-photomap may be fabricated.

By simultaneously adopting the photogrammetry in the pseudo-photomap, with respect to a portion other than the scanning locus, a coordinates information can be added, and hence a detailed three-dimensional map can be fabricated.

In this case, of the arbitrary images with the coordinates information obtained in a fabrication process of the pseudo-photomap, two images having a predetermined overlap are selected. Here, it is preferable for the overlap to be approximately 60%.

Figure 12:
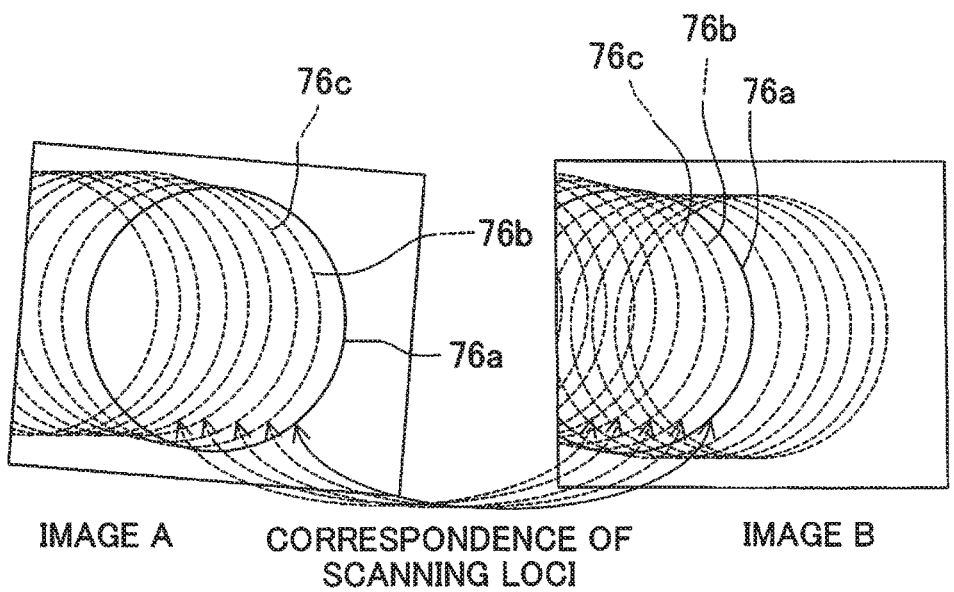
FIG. 12 is an explanatory drawing showing a correspondence between two images and scanning loci in a case where photogrammetry is performed.

FIG. 12 shows an example of two images A and B obtained in the fabrication process of the pseudo-photomap. The images A and B have an overlapping portion as required. The images A and B include the same scanning loci 76a, 76b, 76c, . . . . FIG. 12 shows a correspondence of the scanning loci.

Although the general aerial photogrammetry requires skillful processing, i.e., a relative orientation (obtaining tilts and a rotation relationship of two images) and an absolute orientation (obtaining a relationship with an actual distance on the ground), since tilts can be obtained by a vertical sensor and the rotation can be obtained by the takeover processing of the coordinates information on the continuous scanning loci in the fabrication process of the pseudo-photomap, the conventional relative orientation processing is not required, and the absolute orientation is not required either since the ground is measured by the scanner.

Further, the image-matching processing for the measurement of the photogrammetry could be performed between the corresponding scanning loci, a reliability is improved, and a processing time is shorten.

The processings as describe above, i.e., the association of the image with the scanning locus, the association of the scanning data with the image, the connection of the images based on the scanning loci, the correction of the scanning data based on a detection result of the attitude detector 26, the correction of the images, further the fabrication of the pseudo-photomap, or the like may be performed by the ground base station 4, or may be performed by the control arithmetic component 24 of the measuring device 12.

Further, in the embodiment as describe above, the positional information of the UAV measuring apparatus 2 is obtained by the total station 3, it may be so arranged that a GNSS is mounted on the flying vehicle 11, and the positional information of the UAV measuring apparatus 2 is obtained by the GNSS. Further, both the total station 3 and the GNSS may be provided. In this case, the total station 3 and the GNSS may be appropriately used, for instance, the measurement is carried out by the total station 3 in a place where radio waves from a satellite do not reach or the measurement is carried out by the GNSS in a place where and obstacle is present and the UAV measuring apparatus 2 cannot be tracked by the total station 3, or the like.

Further, as the scanning mode, at least two-dimensional scanning will suffice, and the closed loop scanning is preferable. Further, as the distance measuring light deflecting means, two rotatable mirrors with different rotation directions may be used in place of the optical prism, the deflection may be performed by the mirrors and the two-dimensional scanning may be carried out by the rotations of the mirrors.

Figure 13:
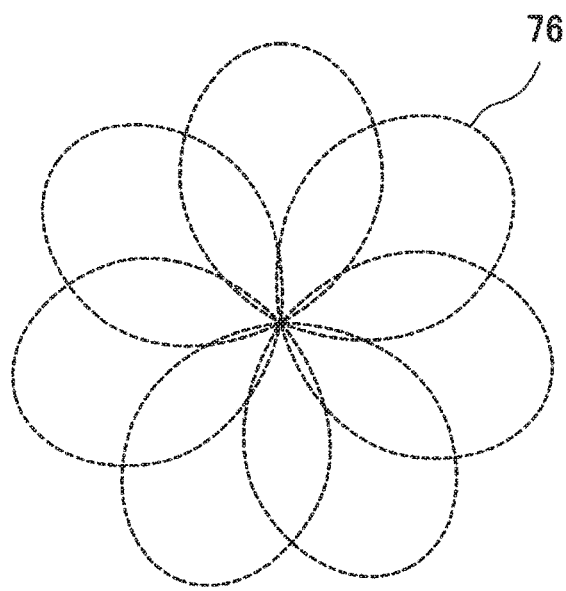
FIG. 13 is a drawing showing an example of a scanning pattern.

Further, the scanning pattern is not restricted to a circle. For instance, various kinds of scanning patterns can be realized by combinations of rotations (the rotating speeds and the rotation directions) of the optical prisms 41a and 41b. FIG. 13 shows an example of the scanning pattern, and shows a case where the scanning is performed in a petaloid pattern.

Further, the image pickup unit 20 does not limited to be integrally incorporated in the measuring device 12, but the image pickup unit 20 may be a camera which is attached to the measuring device 12 with a predetermined relationship and can realize a synchronization, or the like.

It is to be noted that the measuring device 12 is provided to the flying vehicle 11 via the gimbal mechanism 15 in the embodiment as described above but, in a case where a flight device is stable with a slight tilting, by correcting a picked up image based on a tilting detected by the attitude detector 26, the gimbal mechanism 15 may be omitted.

The invention claimed is:

1. An unmanned aerial vehicle (UAV) measuring apparatus comprising: a flying vehicle, a laser scanner mounted on said flying vehicle and for performing two-dimensional scanning with a reference optical axis extending in an approximately vertically downward direction as the center, an image pickup unit having an image pickup optical axis parallel to said reference optical axis and a control arithmetic component, wherein said control arithmetic component is configured to synchronize said two-dimensional scanning performed by said laser scanner with an image pickup performed by said image pickup unit, and to correspond a scanning locus obtained by said two-dimensional scanning with an acquired image, and wherein said control arithmetic component is configured to use a plurality of images with overlapping portions and said scanning loci, and to determine point where said scanning loci intersect with each other as a connecting point, and to connect said images with said scanning loci based on said connecting point.

2. The UAV measuring apparatus according to claim 1, wherein said two-dimensional scanning is a closed loop.

3. The UAV measuring apparatus according to claim 1, wherein said control arithmetic component is configured to image-match a previous image and a subsequent image which are acquired sequentially, to repeat to take over an information of a scanning locus included in said previous image to a corresponding portion of said subsequent image, and to integrate said information of said scanning locus in one image.

4. The UAV measuring apparatus according to claim 1, further comprising an attitude detector for detecting a tilt angle with respect to a verticality, wherein said attitude detector is configured to detect a tilt angle of said reference optical axis with respect to the verticality, and said control arithmetic component is configured to correct scanning data obtained by said laser scanner based on the detected tilt angle and to correct an acquired image to a horizontal image.

5. The UAV measuring apparatus according to claim 4, wherein said control arithmetic component is configured to acquire two images in which said information of said scanning locus are integrated in such a manner that an overlapping portion is present, to correct said two images to a horizontal image based on a detection result of said attitude detector, to image-match said two images based on said scanning loci present in said overlapping portion in common, and to fabricate a detailed three-dimensional map.

6. A UAV measuring system comprising a UAV measuring apparatus according to claim 1 and a total station installed at a known position, wherein said UAV measuring apparatus has a prism provided with a predetermined relationship with a reference position of said laser scanner, said total station is configured to measure said prism while tracking said prism, and to convert a measurement result by said UAV measuring apparatus into three-dimensional data of a ground coordinates system based on a distance measurement result of said total station.

7. A UAV measuring system comprising a UAV measuring apparatus according to claim 2 and a total station installed at a known position, wherein said UAV measuring apparatus has a prism provided with a predetermined relationship with a reference position of said laser scanner, said total station is configured to measure said prism while tracking said prism, and to convert a measurement result by said UAV measuring apparatus into three-dimensional data of a ground coordinates system based on a distance measurement result of said total station.

8. A UAV measuring system comprising a UAV measuring apparatus according to claim 3 and a total station installed at a known position, wherein said UAV measuring apparatus has a prism provided with a predetermined relationship with a reference position of said laser scanner, said total station is configured to measure said prism while tracking said prism, and to convert a measurement result by said UAV measuring apparatus into three-dimensional data of a ground coordinates system based on a distance measurement result of said total station.

9. A UAV measuring system comprising a UAV measuring apparatus according to claim 4 and a total station installed at a known position, wherein said UAV measuring apparatus has a prism provided with a predetermined relationship with a reference position of said laser scanner, said total station is configured to measure said prism while tracking said prism, and to convert a measurement result by said UAV measuring apparatus into three-dimensional data of a ground coordinates system based on a distance measurement result of said total station.

10. A UAV measuring system comprising a UAV measuring apparatus according to claim 5 and a total station installed at a known position, wherein said UAV measuring apparatus has a prism provided with a predetermined relationship with a reference position of said laser scanner, said total station is configured to measure said prism while tracking said prism, and to convert a measurement result by said UAV measuring apparatus into three-dimensional data of a ground coordinates system based on a distance measurement result of said total station.

* * * * *